Figure 1:
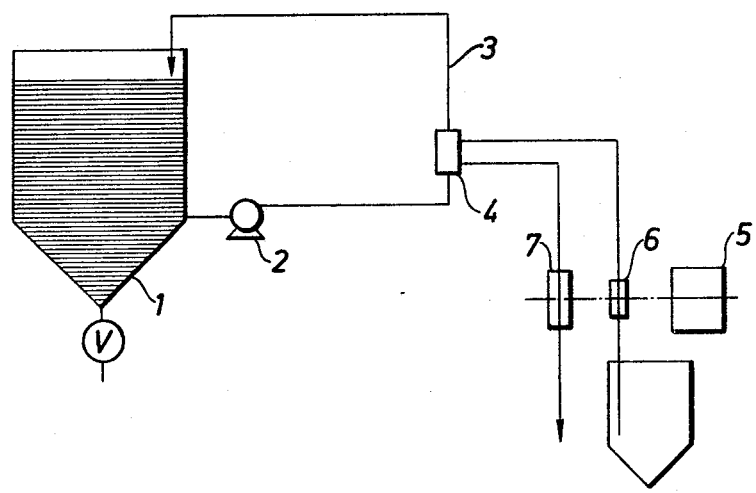

United States Patent [19]
Lindberg

[11] 3,722,291
[45] Mar. 27, 1973

[54] METHOD AND APPARATUS FOR TAKING SAMPLES OF LIQUID MEDIA

[76] Inventor: Arne Robert Lindberg, Slingeratan 18, Molndal, Sweden

[22] Filed: Nov. 3, 1970

[21] Appl. No.: 86,453

[30] Foreign Application Priority Data

Nov. 3, 1969 Sweden .............................. 15067/69

[52] U.S. Cl. ............................................... 73/422 R
[51] Int. Cl. ............................................... G01n 1/14
[58] Field of Search ........... 73/421 B, 421.5 A, 422 R

[56] References Cited

UNITED STATES PATENTS

| | | | |
|---|---|---|---|
| 3,046,791 | 7/1962 | Dinteren | 73/422 R |
| 3,459,047 | 8/1969 | Sumansky | 73/422 R |
| 3,437,452 | 4/1969 | Bell et al. | 73/421 B |
| 2,682,277 | 6/1954 | Marshall et al. | 73/421.5 A |

*Primary Examiner*—S. Clement Swisher
*Attorney*—Albert M. Parker

[57] ABSTRACT

An apparatus and a method for taking samples of liquid media from a main conduit said liquid media comprising the use of a rinsing medium, which through an inlet conduit is led to the immediate vicinity of a sampling point communicating with said main conduit and together with a sampling quantity is withdrawn from said sampling point via an outlet conduit. The sampling quantity instantaneously taken out from said main conduit being determined by corresponding regulation of the flow of said rinsing medium in said conduits.

3 Claims, 4 Drawing Figures

PATENTED MAR 27 1973 3,722,291

METHOD AND APPARATUS FOR TAKING SAMPLES OF LIQUID MEDIA

The present invention relates to a method and an apparatus for taking samples of liquid media, using a rinsing medium.

At present there exist considerable difficulties in automatically sampling a small quantity of a representative sample for analysis in an industrial process. Sampling equipment already known is often rapidly blocked up by deposits and it is also difficult to keep the sampling quantity constant. Another drawback with known equipment is that the transport time to the analysis equipment is often too long.

It has now been possible to overcome the drawbacks of the apparatus described above by the following apparatus and method. According to the present invention a diluting liquid or a gas is used as the rinsing medium and said rinsing medium is led through an inlet conduit to the immediate vicinity of a sampling point, to be led together with a sampling quantity through an outlet conduit, the sampling quantity instantaneously taken out being determined by corresponding regulation of the flow of the rinsing medium in said conduits.

The method proposed according to the invention may be carried out with an apparatus comprising a housing in the sampling conduit through which the medium flows, said housing having an inlet conduit for the rinsing medium and an outlet conduit communicating with the mouth of the inlet conduit by means of a connecting conduit, the connecting conduit also being provided with an inflow aperture communicating with the sampling conduit and located slightly above the mouth of the inlet conduit, said aperture being so arranged that the rinsing medium flows at least partly through it during the sampling operation and that a mixture of the sample withdrawn and the rinsing medium is sucked out through the outlet conduit.

The part of the housing projecting into the conduit is then suitably in the form of a flow-divider, pointed on the downflow side so that the inflow aperture is shaped as a two-sided, semi-elliptical hole.

According to another suitable embodiment of the invention the inlet and outlet conduits may be connected by conduits to a pump having two pump heads, one of the pump heads being arranged to force the rinsing medium to the inlet and the other pump head being arranged to suck the rinsing medium mixed with the sample, out of the housing through the outlet conduit.

In the following the invention will be further described with reference to the accompanying drawings, in which FIG. 1 shows a general sketch of the sampling principle proposed according to the invention, FIG. 2 a section through a liquid conduit with a sampling station according to the invention inserted, FIG. 3 an enlarged detail of the sampling station, and FIG. 4 a view from the front of the sampling station arranged in the conduit.

The principle proposed according to the invention can be used with advantage in the manner shown in FIG. 1. In this figure a processing vessel is designated 1. The processing solution is pumped by a conventional circulation pump 2 through a conduit 3 having a sampling station 4. The sampling station 4 is in communication with a pump 5, for example of the deplacement type, having two pump heads 6, 7. A rinsing medium is forced by one pump head 6 to an inlet channel 8 in the sampling station 4 and the other pump head 7, which has a capacity equal to the rinsing medium plus the desired sampling quantity, sucks a mixture of the sample and the rinsing medium out of the sampling station 4 through an outlet channel 9 and forces the mixture to an analysis apparatus, not shown.

Figure 2:
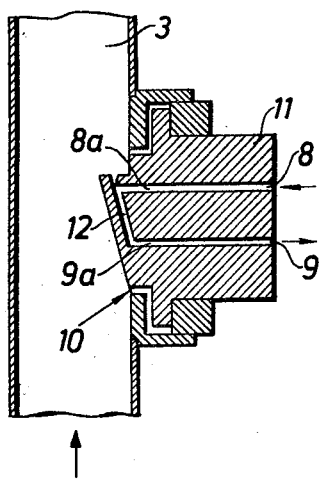
Figure 3:
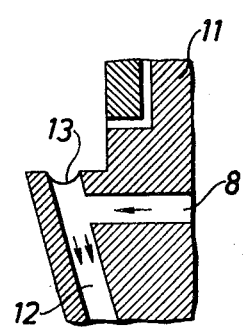
Figure 4:
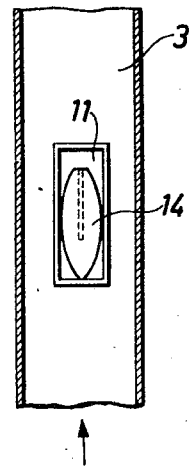

The sampling station 4 is shown in more detail in FIGS. 2, 3 and 4 and consists in principle of a housing 11 inserted through an opening 10 in the channel 3. Said inlet 8 and outlet 9 are arranged in the housing and spaced from each other. In the embodiment shown in the drawings they are located substantially perpendicular to the longitudinal axis of the channel 3, the front ends 8a and 9a, respectively, opening into a conduit 12 connecting inlet and outlet. This conduit is slightly slanting in relation to the longitudinal axis of the channel 3. The connecting conduit 12 has a two-sided, semi-elliptical inflow aperture 13, the part of the housing 11 projecting into the channel 3 being shaped as a flow-divider 14, pointed on the downflow side. An inflow aperture is thus obtained which is not easily clogged. Since the rinsing medium via the inlet 8 is supplied to the mouth of the inflow aperture 13, the risk of clogging is almost entirely eliminated.

The rinsing medium may be either a liquid or a gas, for example air.

The means proposed according to the invention has been successfully tested in sampling waste water, for example and drainage sedimentation, using air, water and bichromate sulphuric acid as rinsing medium, and in sampling lime while using hydrochloric acid as rinsing medium.

What I claim is:

1. An apparatus for taking samples of liquid media, using a rinsing medium, from a sampling conduit through which the medium has flowed, wherein the sampling quantity instantaneously taken out is determined by corresponding regulation of the flow of the rinsing medium, comprising a housing mounted on and projecting into the sampling conduit through which the medium flows, said housing having an inlet conduit for the rinsing medium and an outlet conduit communicating with the mouth of the inlet conduit for withdrawal of a mixture of the rinsing medium with the sample, said inlet conduit being arranged substantially perpendicular to the longitudinal axis of the sampling conduit, a connecting conduit arranged at an angle to both said inlet and outlet conduits providing the communication therebetween, the connecting conduit having an inflow aperture for sucking a sample of the liquid medium from the sampling conduit, said aperture being formed in that portion of the housing which projects into the sampling conduit and being located slightly above the mouth of the inlet conduit, said aperture being so arranged that the rinsing medium flows at least partly therethrough during the sampling operation and so that a mixture of the sample withdrawn and the rinsing medium is sucked out of the connecting conduit through the outlet conduit.

2. An apparatus according to claim 1, wherein the inlet conduit and the outlet conduit are connected via conduits to a double-operating pump having two pump heads, one of the pump heads being arranged to force the rinsing medium to the inlet and the other pump head being arranged to suck the rinsing medium mixed with the sample, out of the housing through the outlet conduit.

3. An apparatus according to claim 2 wherein the part of the housing projecting into the sampling conduit is in the form of a flow divider pointed on the downflow side.

* * * * *